(12) United States Patent
Van Neste (10) Patent No.: US 8,610,556 B2
(45) Date of Patent: *Dec. 17, 2013

(54) AUTOMOBILE COMMUNICATION SYSTEM

(76) Inventor: Kenneth J. Van Neste, Hampstead, NC (US)

( * ) Notice: Subject to any disclaimer, the term of this patent is extended or adjusted under 35 U.S.C. 154(b) by 140 days.

This patent is subject to a terminal disclaimer.

(21) Appl. No.: 13/216,756

(22) Filed: Aug. 24, 2011

(65) Prior Publication Data

US 2011/0307156 A1    Dec. 15, 2011

Related U.S. Application Data

(63) Continuation-in-part of application No. 12/418,716, filed on Apr. 6, 2009, now Pat. No. 8,009,030.

(60) Provisional application No. 61/135,596, filed on Jul. 21, 2008.

(51) Int. Cl.
*B60Q 1/26* (2006.01)

(52) U.S. Cl.
USPC .......................................... 340/468

(58) Field of Classification Search
USPC ............ 340/468, 466, 467, 479, 464, 426.19; 701/1

See application file for complete search history.

(56) References Cited

U.S. PATENT DOCUMENTS

| | | | | |
|---|---|---|---|---|
| 6,335,681 | B1 * | 1/2002 | Ontiveros et al. | 340/466 |
| 6,765,495 | B1 * | 7/2004 | Dunning et al. | 340/903 |
| 7,474,231 | B2 * | 1/2009 | Sohr | 340/903 |
| 7,821,381 | B2 * | 10/2010 | Curtis | 340/425.5 |
| 2007/0168129 | A1 * | 7/2007 | Thorne | 701/301 |

* cited by examiner

*Primary Examiner* — Phung Nguyen (74) *Attorney, Agent, or Firm* — Dale J. Ream (57) ABSTRACT

A communication system for use with an automobile having an accelerator, a brake, a cruise control, and a brake lamp includes a display, a transmitter, a receiver, and a cruise lamp visible from outside the automobile. The communication system includes a processor in data communication with the accelerator, the brake, the cruise control, the brake lamp, the display, the transmitter, the receiver, and the cruise lamp. The processor includes programming to actuate the automobile's cruise control to synchronize with the cruise control of a nearby vehicle having an activated cruise control. The processor actuates the accelerator to accelerate or decelerate according to cruise data received from the nearby synchronized automobile. The system may include a GPS such that current GPS and speed data may be compared with received GPS and speed data to determine a proximity and rate of closure between synchronized automobiles.

19 Claims, 5 Drawing Sheets

AUTOMOBILE COMMUNICATION SYSTEM

CROSS REFERENCE TO RELATED APPLICATION

This non-provisional patent application is a continuation-in-part of non-provisional application Ser. No. 12/418,716 filed Apr. 6, 2009 titled Automobile Communication System which claims the benefit of provisional application Ser. No. 61/135,596 filed on Jul. 21, 2008 titled Courtesy Cruise Light.

BACKGROUND OF THE INVENTION

This invention relates generally to communication systems and, more particularly, to an automobile communication system that utilizes input from an automobile cruise control, accelerator, and brake systems to activate, deactivate, and control a cruise control light positioned on or in proximity to the automobile's rear window brake light. The present system also enables the cruise control system of one vehicle to communicate with and be synchronized with the cruise control system of another vehicle such that speed variations by a leading car may me mimicked by a following car.

Automobile cruise control systems have become standard on modern automobiles. Such systems enable drivers to maintain a consistent speed without manipulating the accelerator or brake pedals. Of course, there are occasions when the cruise control must be turned off such as when traffic is heavy or when rapid braking is needed due to speed variations of other vehicles. Another difficulty with cruise control is that other drivers are unable to discern if another vehicle is using its cruise control. In other words, other drivers might change their own driving behavior if they know that a surrounding vehicle is using cruise control and, as a result, may not be as quick to respond to sudden speed variations of other vehicles.

Therefore, it would be desirable to have an automobile communication system that energizes a light positioned near a rear window brake light when the vehicle cruise control system is activated. Further, it would be desirable to have an automobile communication system that transmits a signal for receipt by surrounding vehicles indicating that the transmitting automobile is utilizing cruise control. In addition, it would be desirable to have an automobile communication system having a cruise control that may be synchronized with the cruise control of a nearby automobile.

SUMMARY OF THE INVENTION

This essence of this invention is to activate a cruise control light whenever the vehicle's cruise control system is activated so that other vehicles are put on notice that the first vehicle's cruise control is in use. Then, if the first vehicle activates the acceleration feature of the cruise control or even manually accelerates in speed, the cruise light is energized to strobe, blink, or otherwise be modified to put surrounding vehicles on notice of the acceleration. Conversely, the cruise light is temporarily de-energized to notify surrounding drivers that the first car is slowing down, at least temporarily. Encouraging the use of cruise control promotes the conservation of fuel in that less fuel is used when a constant speed is maintained.

A major object of the present invention is to encourage and urge other drivers to participate in the benefits of using cruise control. Beyond that, there is a desire to promote a sense of community and togetherness surrounding the use of cruise control. To that end, another aspect of this system will be to enable each cruise light system to communicate with other nearby communication systems while driving. In other words, each system will transmit its presence and when it is accelerating or coasting such that all other nearby systems are put on notice and may even be able to graphically display the location of other nearby systems and their current status (e.g. if their cruise control is on, is accelerating, or is coasting). This will enable all participating drivers to become safer drivers by having more information available while driving. In fact, it is contemplated that the system may utilize GPS technology to identify the exact locations of nearby vehicles that have independently been identified as using respective cruise control systems. This information may be displayed for the driver to know not only which nearby vehicles are using cruise control, but whether they are maintaining a safe driving distance.

According to a preferred embodiment of the present invention, a communication system for use with an automobile having an accelerator, a brake, a cruise control, and a brake lamp includes a display, a transmitter, a receiver, and a cruise lamp visible from outside the automobile. The communication system includes a processor in data communication with the accelerator, the brake, the cruise control, the brake lamp, the display, the transmitter, the receiver, and the cruise lamp. A memory includes programming that when executed by the processor causes the processor to actuate the display to present data received by the receiver and to actuate the cruise lamp when the cruise control is actuated. The processor according to programming may actuate the transmitter to transmit cruise data when the cruise control is actuated. Programming also causes the cruise lamp to blink when the cruise control is actuated while the accelerator is actuated. Programming may also actuate the transmitter to transmit acceleration data when the cruise control and the accelerator are actuated.

According to another aspect of the invention, the processor includes programming to actuate the automobile's cruise control to synchronize with the cruise control of a nearby vehicle having an activated cruise control. The processor actuates the accelerator to accelerate or decelerate according to cruise data received from the nearby synchronized automobile. The system may include a GPS such that current GPS and speed data may be compared with received GPS and speed data to determine a proximity and rate of closure between synchronized automobiles.

Therefore, a general object of this invention is to provide a communication system for an automobile that visually indicates to the drivers of other vehicles in the proximity of the equipped automobile that the equipped automobile's cruise control system is activated.

Another object of this invention is to provide an automobile communication system, as aforesaid, that transmits a signal to other vehicles in its proximity that its cruise control is activated.

Still another object of this invention is to provide an automobile communication system, as aforesaid, that receives signals from other equipped vehicles in its proximity that respective cruise controls are activated.

Yet another object of this invention is to provide an automobile communication system, as aforesaid, that transmits and receives signals indicative of vehicle acceleration and deceleration and displays received data.

A further object of this invention is to provide an automobile communication system, as aforesaid, that selectively synchronizes operation of the cruise control of one vehicle with the cruise control of another vehicle.

A still further object of this invention is to provide an automobile communication system, as aforesaid, that monitors a safe distance between two vehicles whose cruise control systems are in synchronous communication.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

An automobile communication system will now be described in detail with reference to FIG. 1 through FIG. 5 of the accompanying drawings. More particularly, a communication system 100 of one embodiment for use with an automobile having an accelerator 12, a brake 14, a cruise control 16, a brake lamp 18, and a speedometer 20, includes a display 102 (e.g., a visual display that can be seen inside the automobile), a transmitter 104, a receiver 106, a cruise lamp 108, a user input 112, a GPS system 114, and a processor 110.

Figure 1:
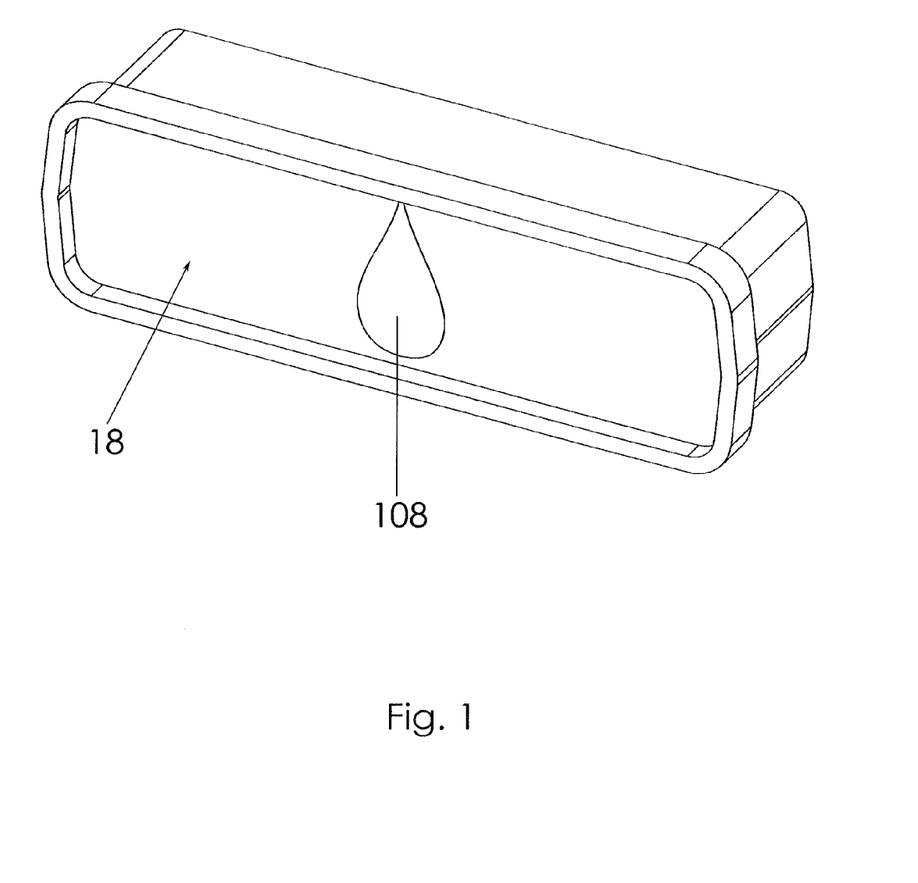
FIG. 1 is a perspective view of an automobile rear window brake light and cruise light according to a preferred embodiment of the present invention.

The cruise lamp 108 is visible from outside the automobile. In some embodiments, the cruise lamp 108 is installed in the automobile during manufacture of the automobile. As shown in FIG. 1, the cruise lamp 108 may be teardrop shaped and located inside the brake lamp 18.

Figure 2:
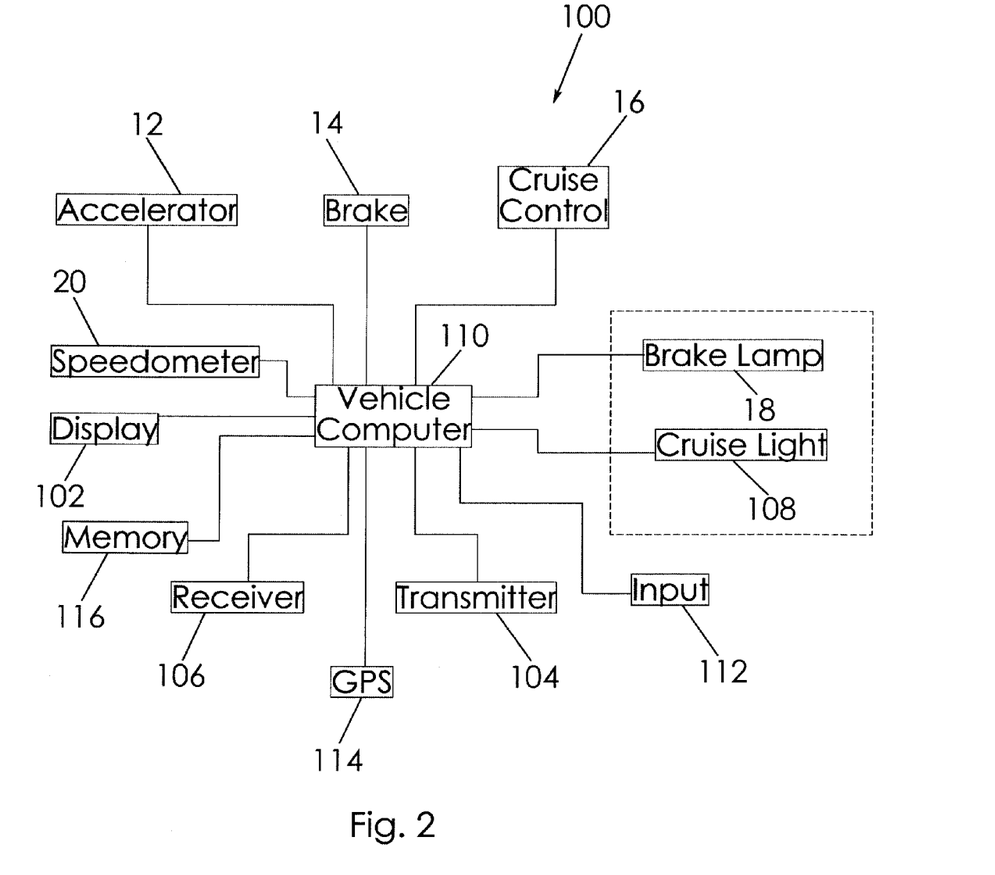
FIG. 2 is a block diagram of the electronic components of the present invention.
Figure 3:
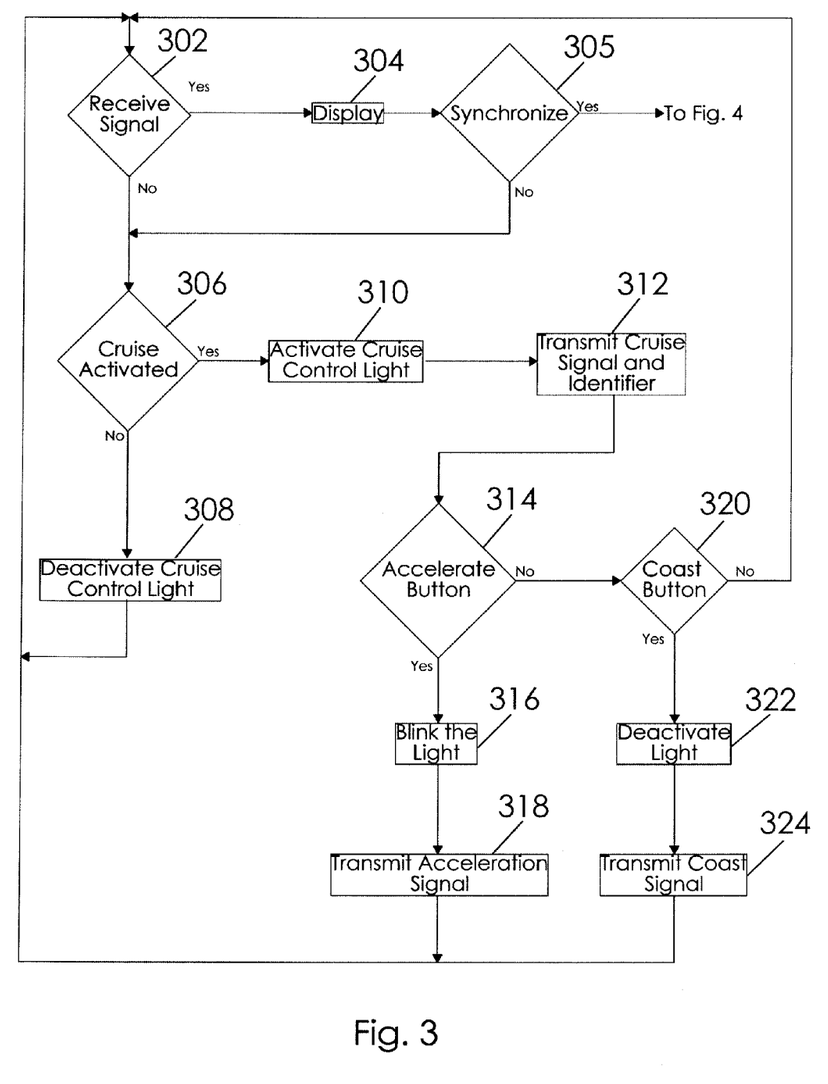
FIG. 3 is a flowchart illustrating the logic performed by the processor according to a cruise light aspect of the present invention.

As shown in FIG. 2, the processor 110 is in data communication with the accelerator 12, the brake 14, the cruise control 16, the brake lamp 18, the display 102, the transmitter 104, the receiver 106, and the cruise lamp 108. The processor 110 includes various programming, some of which is described in process 300 (FIG. 3). It is understood that the programming may be stored in a memory 116 for execution by the processor as is commonly known in the art. The processor 110, therefore, actuates various actions upon execution of respective program instructions. In the description below, it is to be understood that operations by the processor 110 are the result of the processor 110 executing programming stored in memory 116.

At step 302 of the process 300, the processor 110 determines if the receiver 106 has received data from a remote transmitter (i.e., a transmitter from a communication system of another automobile). If so, the processor 110 actuates the display 102 at step 304 to convey the data and then proceeds to step 306. For example, the display 102 may indicate that an adjacent automobile is utilizing its cruise control. If the receiver 106 has not received data from a remote transmitter, the process 300 proceeds from step 302 to step 306.

At step 306, the processor 110 determines if the cruise control 16 is actuated. If not, the process 300 proceeds to step 308, where the processor 110 deactivates the cruise lamp 108 if the cruise lamp 108 was previously actuated, and then the process 300 returns to step 302. If the cruise control 16 is actuated, the process 300 continues from step 306 to step 310.

At step 310, the processor 110 actuates the cruise lamp 108, and the process 300 continues to step 312. At step 312, the processor 110 actuates the transmitter 104 to transmit cruise data (i.e., data indicating that the cruise control 16 is actuated) to adjacent automobiles, and the process 300 continues to step 314.

At step 314, the processor 110 determines if the accelerator 12 is actuated. The accelerator 12 may be, for example, an acceleration feature that is part of the automobile's cruise control 16 or an accelerator pedal. If the accelerator 12 is actuated, the process 300 proceeds to step 316; if not, the process 300 continues to step 320.

At step 316, the processor 110 causes the cruise lamp 108 to blink to indicate to adjacent automobiles that both the cruise control 16 and the accelerator 12 are actuated. The process 300 continues from step 316 to step 318, where the processor 110 actuates the transmitter 104 to transmit cruise acceleration data (i.e., data indicating that both the cruise control 16 and the accelerator 12 are actuated) to adjacent automobiles, and the process 300 returns to step 302.

At step 320, the processor 110 determines if a coast (i.e., deceleration) setting of the cruise control 16 is actuated. If not, the process 300 returns to step 302; if so, the process 300 proceeds to step 322.

At step 322, the processor 110 causes the cruise lamp 108 to deactivate. The process 300 continues from step 322 to step 324, where the processor 110 actuates the transmitter 104 to transmit cruise coast data (i.e., data indicating that both the cruise control 16 and a coast setting are actuated) to adjacent automobiles, and the process returns to step 302.

It should be appreciated that, in returning to step 302 (e.g., from steps 308, 318, 320, and 324), the process 300 may operate in a continuous or near-continuous loop, and that changes may therefore be detected and addressed.

In use, then, other drivers may be alerted to the operation of the automobile through various manners. For example, a trailing driver may see that the cruise lamp 108 is actuated (e.g., at step 310) and know that the automobile is being piloted using its cruise control 16. Similarly, the trailing driver may see that the cruise lamp 108 is blinking (e.g., at step 316) and know that, while the automobile is being piloted using its cruise control 16, it is also accelerating. And the trailing driver may see that the cruise lamp 108 has been deactivated (e.g., at step 308 or step 322) and know that the cruise control 16 has been deactivated or that, though the automobile is being piloted using its cruise control 16, it is nevertheless operating at a coast setting. In addition, the transmission of data by the transmitter 104 (e.g., at steps 312, 318, and 324) may allow vehicles that are behind, beside, and even in front of the automobile to know whether the cruise control 16 is actuated, and if so, whether the automobile is nevertheless accelerating or coasting. More particularly, those vehicles may obtain the transmitted data using respective receivers, and the data may then be presented to those drivers (e.g., on a visual display, audibly, etc.). The automobile may be distinguished by the other vehicles in various ways. For example, the transmitted data may include identifying information (e.g., color, make, model, etc.) about the automobile.

By providing this additional information to other drivers, those other drivers may drive more safely. In addition, drivers may be encouraged to utilize their respective cruise controls by seeing others use cruise control. In other words, not only does the present system have the potential to increase the amount of useful information available on the roadways, but it also has the potential to connect many people together in a common bond of promoting the use of cruise control and highway safety. A more widespread use of cruise control may conserve fuel and also relieve some aggression from the roadways.

Another aspect of the present invention will now be described with regard to the drawings previously discussed and also with specific reference to FIGS. 4 and 5. Beyond the components previously disclosed, the communications system 100 may further include programming stored in memory 116 in data communication with the processor 110 for execution thereby. In addition, the system may include a user input 112 that enables a driver to communicate decisions or instructions to the processor 110 as will be described below. The system 100 may also include a global position system (GPS) 114 configured to output global position data such that the global position of the vehicle is always known and included in the cruise data transmitted by the transmitter 104. Speed data from the vehicle's speedometer 20 may also be incorporated into the transmitted data.

According to the present aspect of the communication system, a driver is able to "synchronize" the cruise control 16 of his vehicle with a cruise control system of a nearby vehicle. The user's vehicle may be referred to as a "follower" and the vehicle being synchronized with may be referred to the "leader" or "leading" vehicle. As shown in FIG. 3, a driver may select at step 305 whether or not to synchronize his vehicle's cruise control with that of a nearby vehicle. Note that the step 305 for choosing if synchronization is desired comes only after the communication system 100 has received cruise data from another vehicle and activated the display 102 so as to visually present that data. If synchronization is not desired, the process proceeds to step 306 and operation proceeds according to process 300 as described above. However, if synchronization of cruise controls is desired, the process 300 proceeds to the process 400 shown in FIG. 4.

Figure 4:
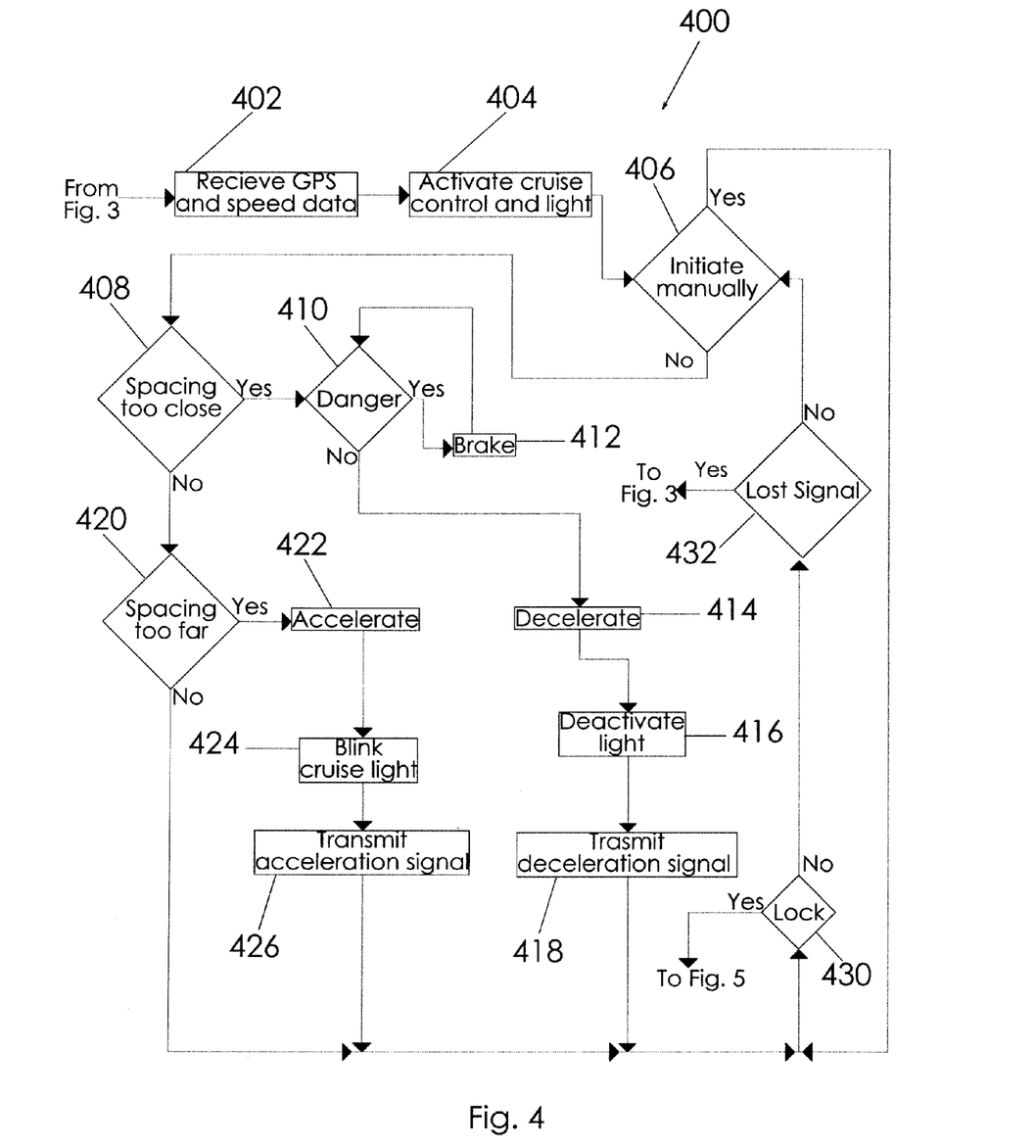
FIG. 4 is a flowchart illustrating the logic performed by the processor according a synchronization initiation aspect of the invention.

The process 400 of FIG. 4 may be referred to herein as synchronization initiation procedures or a synchronization initiation process 400. At step 402, cruise data is received by the receiver 106 and includes GPS and speedometer data from the leading vehicle. The process 400 then proceeds to step 404 which automatically activates the following vehicle's cruise control 16. The process 400 then proceeds to step 406 at which the processor 110 determines if the driver (of the following vehicle) desires to initiate synchronization manually or to request the processor 110 to undertake the synchronization initiation procedures automatically. A user may select this option using the user input 112 which may be a touch screen option on the display 102 or some other input device situated in the vehicle in electrical communication with the processor 110. If the driver chooses to manually initiate the synchronization, then he simply accelerates, decelerates, and steers his vehicle to an appropriate position behind the vehicle being synchronized with (the "leader") and then selects "Lock" or similar acknowledgement at step 430 using the user input 112.

Figure 5:
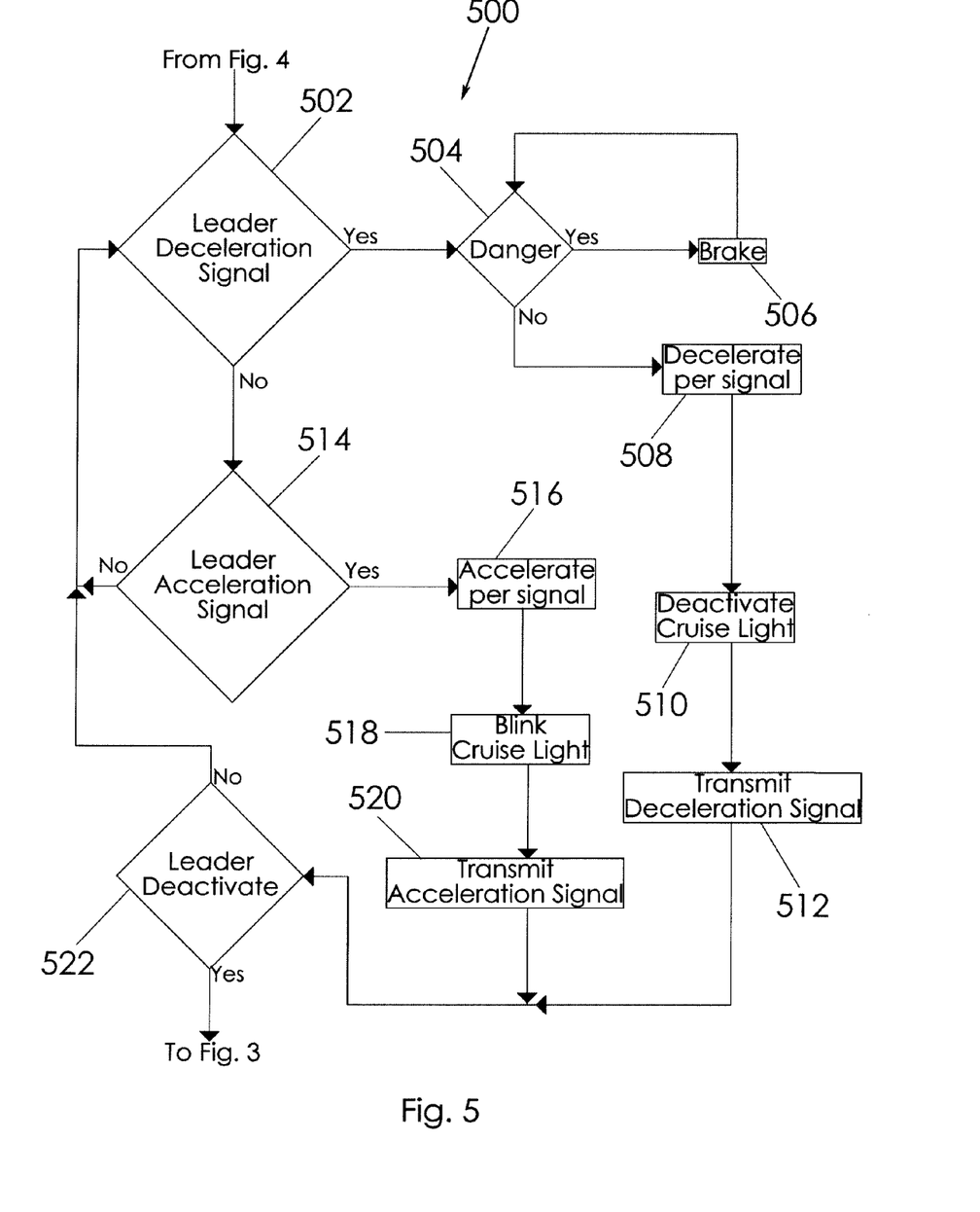
FIG. 5 is a flowchart illustrating the logic performed by the processor according a synchronization maintenance aspect of the invention.

If the processor 110 receives an input 112 at step 430 that synchronization may begin, the process 400 advances to the synchronization maintenance procedures shown in FIG. 5. If, however, the processor 110 receives an input indicative that the driver is not ready or that synchronization is not yet suitable, then the process 400 proceeds to step 432 where the processor 110 determines if the cruise data received previously is no longer being received, e.g. that the leader vehicle has deactivated its cruise control 16. In that case, the process 400 sends control back to step 302 of FIG. 3 and the system 100 monitors for the presence of other vehicles operating on cruise control. If, however, the processor 110 determines that the signal is still being received, the process 400 proceeds back to step 406 for determination if the driver still desires to manually initiate synchronization or desires for the processor 100 to initiate automatically.

If the processor 110 determines at step 406 that the driver desires processor 110 controlled initiation, then the process 400 proceeds from step 406 to step 408. At step 408, the processor 110 determines if the spacing or distance between the leader vehicle and follower vehicle is less than a predetermined distance. More particularly, processor 110 executes programming causing the processor 110 to compare current GPS data and speed data with GPS and speed data received by the receiver 106. In other words, the GPS and speed data from the leader vehicle is compared with GPS and speed data of the follower vehicle to determine their relative proximity and rate of closure. The rate of closure may be a positive or negative number indicative of the two vehicles becoming more or less distant from one another. With specific reference to FIG. 4, if the processor 110 determines at step 408 that the spacing between the two vehicles is too close, then the process 400 proceeds to step 410; otherwise, the process proceeds to step 420.

At step 420, if the processor 110 determines there is actually too much space between the two vehicles—again determined by comparing GPS and speed data—then the process 400 proceeds to step 422 where the processor 110 actuates the accelerator 12 to accelerate so as to close the gap.

If after executing steps 408 and 420 the processor 110 determines that the spacing is neither too close nor too far, then the process 400 proceeds to step 430. At step 430, the processor 110 determines if synchronization should begin, i.e. be "locked." If so, then process 400 proceeds to the process 500 illustrated in FIG. 5. If the processor 110, however, does not receive an indication to synchronize at step 430, then the process 400 proceeds to step 432 to determine if cruise signals (from the leading vehicle) are still received. If cruise signals are no longer being received, this may be an indication that the leading vehicle is no longer on cruise control and control is returned to FIG. 3 at step 302. However, if signals are still being received, then the process 400 returns to step 406 to determine if the driver still wants initiation to be under processor control or to be manual, as described above.

Returning attention now to step 422, if the processor 110 determines that spacing is to far, the processor 110 actuates the cruise light 108 to blink at step 424 when the accelerator 12 is actuated to accelerate. The processor 110, under programming control, actuates the transmitter 104 to transmit an acceleration signal at step 426. It will be better understood later that this transmission enables another user to synchronize with the cruise control 16. Similarly, the processor 110, at step 416 actuates deactivation of the cruise light 108 following a deceleration at step 414. The process 400 then proceeds to step 418 at which the processor 110 actuates the transmitter 104 to transmit a deceleration signal.

In addition, the processor 110, according to programming, makes a further proximity safety check after checking at step 408 if spacing is too close. Specifically, if the processor 110 at step 408 determines that spacing is too close (using GPS and speedometer data as described above), the processor 110 determines if the proximity and rate of closure is at a predetermined "dangerous" parameter. For instance, if the leader vehicle applied its brakes suddenly, actuating a mere "deceleration" in the following vehicle would be insufficient to avoid a rear-end collision. Therefore, if a dangerously close proximity and rapid rate of closure is indicated, then the processor 110 executes programming to actuate operation of the vehicle's brake 14. As shown in FIG. 4, this safety test and braking procedure is performed repeatedly until the dangerous situation no longer exists, in which case the process 400 proceeds to step 414 to actuate the accelerator 12 to decelerate normally.

The process 400 described above is repeated until the processor 110 determines that the user has confirmed at step 430 that synchronization is properly initiated and is "locked" on, at which time control is passed to process 500 shown in FIG. 5 and referred to as synchronization maintenance procedures.

The process 500 carried out upon the execution of programming by the processor 110 is substantially similar to the process 400 and, where similar, will be described in less detail than above. The main difference is that the processor 110 actuates the accelerator to accelerate or decelerate, as the case may be, according to acceleration or deceleration data received by the receiver and not from GPS and speed data. In other words, the processor 110 evaluates received data, i.e. cruise data, to determine if the leader vehicle is decelerating or accelerating and then actuates the vehicle accelerator 12 to act accordingly so as to maintain the predetermined safe distance.

More particularly, the processor 110 determines if a deceleration signal (also referred to as a "coast" signal) has been received. If so, then the process 500 proceeds to steps 504 and 506 in which a "danger" proximity and braking situation is evaluated as described above. When the processor 110 verifies there is no danger, the process 500 proceeds to step 508 where the accelerator 12 is actuated to decelerate according to the deceleration signal that was received. The process 500 then proceeds to step 510 where the cruise light 108 is deactivated and step 512 where a deceleration signal is transmitted, in the manner described above in more detail.

If at step 502, a deceleration signal was not indicated, the process 500 proceeds to step 514 at which the processor 110 determines if an acceleration signal has been received. If so, the process 500 proceeds to step 516 at which the processor 110, upon execution of respective programming, actuates the accelerator 12 to accelerate according to the received acceleration signal. The process 500 then proceeds to step 518 to blink the cruise light and step 520 to transmit an acceleration signal as described above in more detail.

After an acceleration or deceleration event, the process 500 proceeds to step 522 where the processor 110 determines if cruise signals are still being received by the receiver 106. If so, then the processor 110 concludes that the leader vehicles has not deactivated and the process returns to step 502 to evaluate if any new deceleration or acceleration signals have been received. If, however, the leader vehicle has deactivated its cruise control, the process 500 proceeds from step 522 to non-synchronized process of FIG. 3.

It should be understood that the synchronization initiation process 400 and synchronization maintenance process 500 enable two or more vehicles having cruise control systems to synchronize with each other. In other words, 2, 3, 4, or even more vehicles may, theoretically, caravan together in synchronous engagement with another—preferably the immediately forwardly adjacent vehicle—such that speeds of all of the vehicles are maintained the same. It is also understood that the in-vehicle display 102 may receive data from all of the vehicles within a predetermined range and display it accordingly, thus enabling a driver to pick which vehicle or caravan of vehicles to synchronize with. In particular, it should be appreciated that after each and every actuation of a vehicle's accelerator, an acceleration signal or deceleration signal, as the case may be, is transmitted and may be received by another vehicle for use in synchronizing to it. It is understood that GPS data and speedometer data may also be sent regularly. For instance, all possible data related to the present system 100 may be accumulated in packets of "cruise data" and transmitted.

In use, a driver will become aware of other vehicles that are using cruise control, such as by visually seeing their cruise lights or when notified by the visual display in his vehicle, as described above. If desired, the user may select the option of synchronizing with another vehicle that has an activated cruise control. The driver may manually position his car (a.k.a. the "follower" vehicle) behind the car to be synchronized with (a.k.a. the "leader" vehicle) or enable the cruise control system processor 110 to position the car. If the processor 110 is to initiate synchronization, the processor 110 will utilize GPS and speed data from both the leader and follower vehicles to determine proximity and rate of closure and then actuate the accelerator to either accelerate or decelerate, as the case may be, until the position is suitable. It is understood, that the user should use good judgment on when to use this system depending on how heavy traffic is, the type of highway, etc. In all cases, the user is able to override and deactivate the system, such as by applying the brakes. Once in position, the user may "lock" on the synchronization. Thereafter, the processor 110 monitors acceleration and deceleration signals received from the leader vehicle and actuates the accelerator to adjust accordingly.

Accordingly, all aspects of the present invention promote use of cruise control even to the point of generating feelings of a cruise control community. In any case, the present invention will enable users of cruise control to travel long distances on cruise control without having to manually adjust speeds in reaction to another driver who repeatedly speeds up and slows down for no apparent reason.

It is understood that while certain forms of this invention have been illustrated and described, it is not limited thereto except insofar as such limitations are included in the following claims and allowable functional equivalents thereof.

The invention claimed is:

1. A communication system for use with an automobile having an accelerator, a speedometer, a brake, a cruise control, and a brake lamp, said system comprising:
    a display;
    a transmitter;
    a receiver;
    a memory having programming stored therein;
    a processor in data communication with said accelerator, said brake, said cruise control, said brake lamp, said display, said memory, said transmitter, said receiver;
    programming in said memory that when executed by said processor causes said processor to:
        actuate said display to present data received by said receiver;
        to actuate said transmitter to transmit cruise data when said cruise control is actuated;
        to actuate said accelerator to selectively accelerate or decelerate according to cruise data received by said receiver, respectively; and
        to synchronize actuation of said accelerator according to said data received by said receiver.

2. The system of claim 1, further comprising programming in said memory that when executed by said processor causes said processor to repeatedly actuate said accelerator to accelerate or decelerate according to said data received by said receiver.

3. The system of claim 1, further comprising an input electrically connected to said processor.

4. The system of claim 1, further comprising programming in said memory that when executed by said processor causes said processor to cease synchronizing said accelerator when no said data is received by said receiver.

5. The system of claim 1, further comprising programming in said memory that when executed by said processor causes said processor to actuate said transmitter to transmit cruise data when said cruise control is actuated.

6. The system of claim 1, further comprising:
a cruise lamp visible from outside said automobile, said cruise lamp in data communication with said processor;
programming in said memory that when executed by said processor causes said processor to actuate said cruise lamp when said cruise control is actuated; and
programming in said memory that when executed by said processor causes said processor to actuate said transmitter to transmit cruise data when said cruise control is actuated.

7. The system of claim 6, wherein said display is a visual display.

8. The system of claim 6, further comprising:
programming in said memory that when executed by said processor causes said processor to cause said cruise lamp to blink when said cruise control is actuated while said accelerator is actuated; and
programming in said memory that when executed by said processor causes said processor to actuate said transmitter to transmit cruise acceleration data when said cruise control is actuated while said accelerator is actuated.

9. The system of claim 8, further comprising:
programming in said memory that when executed by said processor causes said processor to cause said cruise lamp to deactivate when said cruise control is actuated in a coast mode; and
programming in said memory that when executed by said processor causes said processor to actuate said transmitter to transmit cruise coast data when said cruise control is actuated in said coast mode.

10. The system of claim 1, further comprising:
programming in said memory that when executed by said processor causes said processor to actuate said accelerator to decelerate when said received data includes deceleration data; and
programming in said memory that when executed by said processor causes said processor to actuate said accelerator to accelerate when said received data includes acceleration data.

11. The system of claim 10, further comprising:
a global positioning system ("GPS") in data communication with said processor, said GPS configured to output global position data;
programming in said memory that when executed by said processor causes said processor to transmit said global position data from said GPS; and
programming in said memory that when executed by said processor causes said processor to transmit speedometer data from said speedometer.

12. The system of claim 11, further comprising:
programming in said memory that when executed by said processor causes said processor to determine if said received data is indicative of cruise coast data;
programming in said memory that when executed by said processor causes said processor to compare current GPS data and current speedometer data with received GPS data and received speedometer data to determine a proximity and rate of closure therebetween if said processor determined that said received data is indicative of cruise coast data; and
programming in said memory that when executed by said processor causes said processor to actuate said brake if said comparison is indicative of an unsafe proximity and rate of closure.

13. The system of claim 12, further comprising programming in said memory that when executed by said processor causes said processor to actuate said accelerator to decelerate without actuating said brake only if said comparison is not indicative of an unsafe proximity.

14. The system of claim 1, further comprising:
a user input in electrical communication with said processor;
programming in said memory that when executed by said processor causes said processor to determine if said user input has indicated a desire to sync with a cruise control of another vehicle;
programming in said memory that when executed by said processor, after determining said desire to synch with a cruise control of another vehicle, causes said processor to carry out synchronization initiation procedures, said synchronization initiation procedures including:
programming in said memory that when executed by said processor causes said processor to compare current GPS data and current speedometer data with received GPS data and received speedometer data to determine a proximity and rate of closure therebetween;
programming in said memory that when executed by said processor causes said processor to actuate said accelerator to decelerate if said determined proximity and rate of closure is less than a predetermined parameter; and
programming in said memory that when executed by said processor causes said processor to actuate said accelerator to accelerate if said determined proximity and rate of close is greater than a predetermined parameter.

15. The system of claim 14, wherein said synchronization procedures include programming in said memory that when executed by said processor causes said processor to end synchronization initiation procedures and proceed to synchronization maintenance procedures if said determined proximity and rate of closure is equal to a predetermined parameter.

16. The system of claim 14, further comprising:
a cruise lamp visible from outside said automobile, said cruise lamp in data communication with said processor;
programming in said memory that when executed by said processor causes said processor to actuate said cruise lamp when said cruise control is actuated; and
programming in said memory that when executed by said processor causes said processor to actuate said transmitter to transmit cruise data when said cruise control is actuated.

17. The system of claim 16, wherein said display is a visual display.

18. The system of claim 16, further comprising:
programming in said memory that when executed by said processor causes said processor to cause said cruise lamp to blink when said cruise control is actuated while said accelerator is actuated; and
programming in said memory that when executed by said processor causes said processor to actuate said transmitter to transmit cruise acceleration data when said cruise control is actuated while said accelerator is actuated.

19. The system of claim 18, further comprising:

programming in said memory that when executed by said processor causes said processor to cause said cruise lamp to deactivate when said cruise control is actuated in a coast mode; and programming in said memory that when executed by said processor causes said processor to actuate said transmitter to transmit cruise coast data when said cruise control is actuated in said coast mode.

* * * * *